(12) United States Patent
DeGregorio et al.

(10) Patent No.: US 7,133,525 B1
(45) Date of Patent: Nov. 7, 2006

(54) COMMUNICATION SECURITY APPARATUS AND METHOD OF USING SAME

(75) Inventors: Neal J. DeGregorio, Berkeley Springs, WV (US); Daniel R. Seeley, Ashburn, VA (US)

(73) Assignee: Communication Security Apparatus Corp., North Potomac, MD (US)

( * ) Notice: Subject to any disclaimer, the term of this patent is extended or adjusted under 35 U.S.C. 154(b) by 891 days.

(21) Appl. No.: 10/358,057

(22) Filed: Feb. 4, 2003

Related U.S. Application Data

(60) Provisional application No. 60/381,268, filed on May 17, 2002.

(51) Int. Cl.
*H04N 1/44* (2006.01)
(52) U.S. Cl. ............... 380/244; 380/260; 380/283; 713/171
(58) Field of Classification Search ............... 380/244, 380/260, 37, 273, 283; 713/171
See application file for complete search history.

(56) References Cited

U.S. PATENT DOCUMENTS

| | | | | |
|---|---|---|---|---|
| 5,163,097 A | * | 11/1992 | Pegg | 713/183 |
| 5,745,577 A | * | 4/1998 | Leech | 380/28 |
| 6,266,413 B1 | * | 7/2001 | Shefi | 380/46 |
| 2002/0114451 A1 | * | 8/2002 | Satterfield | 380/37 |
| 2002/0124177 A1 | * | 9/2002 | Harper et al. | 713/189 |

* cited by examiner

*Primary Examiner*—Jacques Louis-Jacques
*Assistant Examiner*—Roderick Tolentino
(74) *Attorney, Agent, or Firm*—Daniel Robbins

(57) ABSTRACT

Encryption and decryption sites are initially assigned identical one time Vernam like pads, (OTP), and each site is provided with identical compendiums of byte modifying instructions identified by instruction IDs. Encryption is implemented by a random first subset of instructions applied to the current OTP to generate a new OTP. A second subset of random instructions is applied to the message for encryption. The list of IDs of the first subset of instructions is XORed with the current OTP. The list of IDs of the second subset of instructions and the encrypted message are each XORed with the new OTP and all XORed outputs are concatenated into the payload. Decryption is implemented by applying the encryption steps to the payload in reverse order to recover the message and new OTP. A secure, new OTP is therefore available both at the encryption and decryption sites without having been transmitted.

42 Claims, 12 Drawing Sheets

COMMUNICATION SECURITY APPARATUS AND METHOD OF USING SAME

This application claims the benefit of U.S. Provisional Application Ser. No. 60/381,268 filed May 17, 2002.

BACKGROUND OF THE INVENTION

1. Field of the Invention

This invention relates to transmission of information, and in particular to the use of cryptographic encipherment to provide secure communication.

2. Description Relative to the Prior Art

The Vernam cipher is the only known unbreakable method of encryption. Gilbert Vernam developed it in 1917 during WWI while working for AT&T. It makes use of a one-time pad that must be exchanged between the sender and receiver via a secure channel (e.g. face-to-face). The pad must be generated in a totally random manner and must never be reused. Each pad-page must be as long as the largest message. The sender encrypts a plaintext message by combining it with the current pad page via the XOR function. The receiver decrypts the cipher text message by combining it with his current pad page via the XOR function. Both parties discard the current pad page. This procedure repeats itself until the pad is gone. Then, a new pad must be generated and manually distributed in a secure manner. Since each byte in the pad-page sequence is totally random, an attacker is forced to try every possible combination of byte values to arrive at a very large number of potential plaintext meanings.

A method for generating, automatically distributing and using a sufficiently random one-time pad for a Vernam like cipher is disclosed by the present invention.

SUMMARY OF THE INVENTION

The invention encrypts information in packets with a Vernam like mask (i.e. a one-time pad) that is used once, modified and the original mask is then discarded, on a packet-by-packet basis, even though a message may span multiple packets. In a packet carrying encrypted information there are three levels of encryption: one level encrypts the message segment of the packet, the second scrambles an existing encryption mask into a new mask, and at the third level, the new mask further encrypts the initially encrypted message segment. These procedures utilize bit and byte-scrambling encryption techniques followed by a final wrapping of the resultant levels by an XOR.

The encryption system is under the supervision of a cryptographic authority administering the program. The administrator provides each participating site with an initial mask and with a base set of encrypting instructions. Every instruction has a set identifier, an identification label (i.e. operand) and zero or more parameters. Parameters, if required, determine how and where the instruction is to be applied.

A powerful feature of the invention is the additional programming of the scope or reach of an instruction by modification of the instruction's operand as well as of any included defining parameters. These are temporary changes to the instruction, and may be performed on a packet-by-packet or entire message basis to provide a fluidity of encryption deepening the invention's immunity from attack.

The practice of the invention is implemented in the execution of subsets of instructions selected from the base instruction set, and the base instruction set may be conveniently divided into 7 broad categories. These categories are: 1) Communications Setup/Connectivity, 2) Environment/Administration, 3) Data Computation/Substitution, 4) Data Transformation/Mutation, 5) Authentication/Security, 6) Program Logic/Directives, 7) Data Expansion/Contraction.

Communications Setup/Connectivity instructions set up the framework defining the organization of the information subsets to be used in the information transfer. Environment/Administration instructions tell a site the ground rules to apply to a bit or byte stream in order to decrypt the stream. Data Computation/Substitution instructions perform specified algorithms on the bits or bytes comprising data elements. Data Transformation/Mutation instructions perform transformations of position of the bits or bytes to which they are applied. Authentication/Security instructions test the bona fides of the participants prior to, and continuation of, approval of the information exchange. Program Logic/Directive instructions provide the capability to control instruction execution. Data Expansion/Contraction instructions provide for the insertion or compression of data within the packet.

Since masks are continually being modified, each site maintains a running, up-to-date tabulation of its own current mask value, as well as the current mask values of other sites with which it may be, or with which it has been, in contact. Each site has a digital processor capable of executing the base set of instructions on the relevant byte streams, and having adequate memory to securely store the set of instructions, the mask and various tabulations.

Packets are generated in accordance with the communication protocol used for signaling between sites. The transmitted information is carried in a protocol-designated "data field" segment of the packet, and this field is designated as the "payload". Assuming a typical packet protocol having a data field of 1000+ bytes in length, the mask is designed to completely overlap the data field, and is on the order of 2000+ bytes or at least twice as long.

In the transfer of information from one site to another, a preliminary two-way exchange is required between the sites to authenticate the parties in order to establish a cryptographic session. A site having a message it wants to communicate to another site will be designated as the "source", and the intended recipient of the communication will be designated as the "target". Broadly, a source site engages in the message encryption and a target site engages in the message decryption, however, for increased depth of security, a target site, prior to the transfer of the source's first intended message, engages in an encrypted preliminary exchange with the source site for authentication purposes.

In a communications environment, a source site having a message (e.g. text, binary, voice, image, etc), for a specific target site, sends directly or broadcasts a communiqué that contains a payload with its preliminary message as an encrypted segment, and includes another segment in the clear identifying the source site and the target site. The preliminary message is a "Request for Access" by the source to the target site for the purpose of initiating a cryptographic session to transfer information, and the target site as part of the authentication process must acknowledge this preliminary message before the information itself can be sent.

The source encrypts this "Request for Access" message to the target, by organizing two sets of randomly selected base instructions into two ordered lists. The first ordered list of instructions are directed to encryption of the current mask and are sequentially applied by the source to the source's mask to progressively re-format the mask's byte stream as directed by the mask instructions of the list. Encryption of the ID numbers of the instructions comprising this list is then separately XORed with the current source mask in the Vernam manner. The second ordered list of instructions are message related and are applied to the preliminary message, i.e. the "Request for Access". This is the first step of generating the encrypted preliminary message. The IDs of the message list instructions is Vernam like XORed with the new source mask. As a final step, XORing the message with the new source mask just generated further encrypts the byte scrambled preliminary message.

The bytes of these three encrypted groups are incorporated into the payload as separate data fields, and then the packet is sent directly or broadcast by the source to the target site.

On receipt of this communiqué, the target site strips the payload from the packet. The target source has the current mask of the source site in its storage, retrieves it and XORs this retrieved mask with the portion of the received payload that contains the encrypted mask list of instructions. This recovers the list of mask instructions used by the source in generating its new mask. As all sites have the complete sets of base instructions in storage, the target site retrieves the mask encrypting instructions by following the list and applies these instructions in the reverse order to recover the source's new mask. (It will be appreciated that for instructions having vector-like elements, such as the directives "right" or "left" as part of the instruction, during decryption the correspondingly inverse operation is applied). XORing the new source mask with the encrypted field containing the message list of instructions, the target site recovers the list of instruction ID's used by the source in encrypting the message. The target XORs the new mask with the encrypted payload message field. Then it calls up these decrypted instructions from its own storage, and applies them in reverse order to the message portion of the packet data field, containing the encrypted message proper, finally obtaining this source's message in the clear, i.e. the "Request for Access".

A further layer of security to the overall encryption requires that the source site use one or more sets of instructions that are specified by the target site in encrypting the source site's original message for the target site. In its response to the "Request for Access", the target site mirrors the source's steps described above in assembling its own encrypted response. The source's preliminary message was a "Request for Access", while the target site's return message must contain one set of base instructions whose identifiers are randomly remapped, and at least one set of new instructions that are generated by randomly combining base instructions or instructions from newly created instruction sets. The newly created instructions will specify the required parameters, if required. The target provides a set identifier for each instruction set. Instructions are randomly remapped to make the set unique for the particular source and target thus obfuscating their meaning from an attacker when used in subsequent packets. New instructions are created to provide the capability to perform complex transformations with a single identifier. These sets contain the instructions that the target site specifies the source site must use for all packets in the cryptographic session, and these sets become the message portion of the target's response. The target also randomly selects another set of instructions to scramble the target's current mask into its new mask, and a different set to scramble its message. In this case the message contains the sets of instructions to be used by the source. As before, the message portion of the payload will benefit from double encryption, once by the scrambling of its component bytes in accordance with the selected message related instructions, and finally by being wrapped with the new mask derived from the target site's current mask via an XOR.

It will be appreciated that the usage of a random number generator to select something within this process by either the source or target is a purely independent action. The invention does not require like random number generators at both the source and target to encrypt and subsequently decrypt a message.

The payload returned to the source site by the target site contains the encrypted message and the message scrambling instructions, with both of these encrypted by the new mask. The source regenerates the new target mask from its stored value of the target current mask, using the encrypted mask instructions from the received payload. The source site decrypts the new mask and recovers the lists of instructions to unwrap and decrypt the target site's message. In this case, these are the sets of instructions to be followed by the source in encrypting its original planned message.

It will be appreciated that the first exchange of information between two sites follows the routine that consists of the three stages developed above. First, the message source encrypts a "Request for Access", which is essentially an authentication step to establish a cryptographic session. Secondly, the target site accepts the request by sending back the encrypted instruction sets to be used by the source, and thirdly the source encrypts its message using these instructions for transmission back to the target. Each one of these three stages is implemented as a transmitted packet having the encrypted information as part of its payload and the associated mask and message instructions.

For example, a long message from the source site, say, one 8K bytes long, would be split into a series of payloads, e.g. 8–1K payloads as separate packet transmissions. Assuming that this is the first message being sent, the above 3 stages are required to transmit the first 1K packet in order to establish a cryptographic session. Once the cryptographic session is established, the remaining 7–1K packets and other subsequent messages may be transmitted via the instruction sets specified by the target without the need to send a "Request for Access", until the cryptographic session terminates. After the cryptographic session terminates, in order to establish a new cryptographic session, the above 3 stages are required.

At no time are the masks included in the payload. Only the list of mask instructions is transmitted, and that is in encrypted form.

BRIEF DESCRIPTION OF THE DRAWINGS

The invention will be described with respect to the drawings, of which.

DESCRIPTION OF THE PREFERRED EMBODIMENTS

Figure 1:
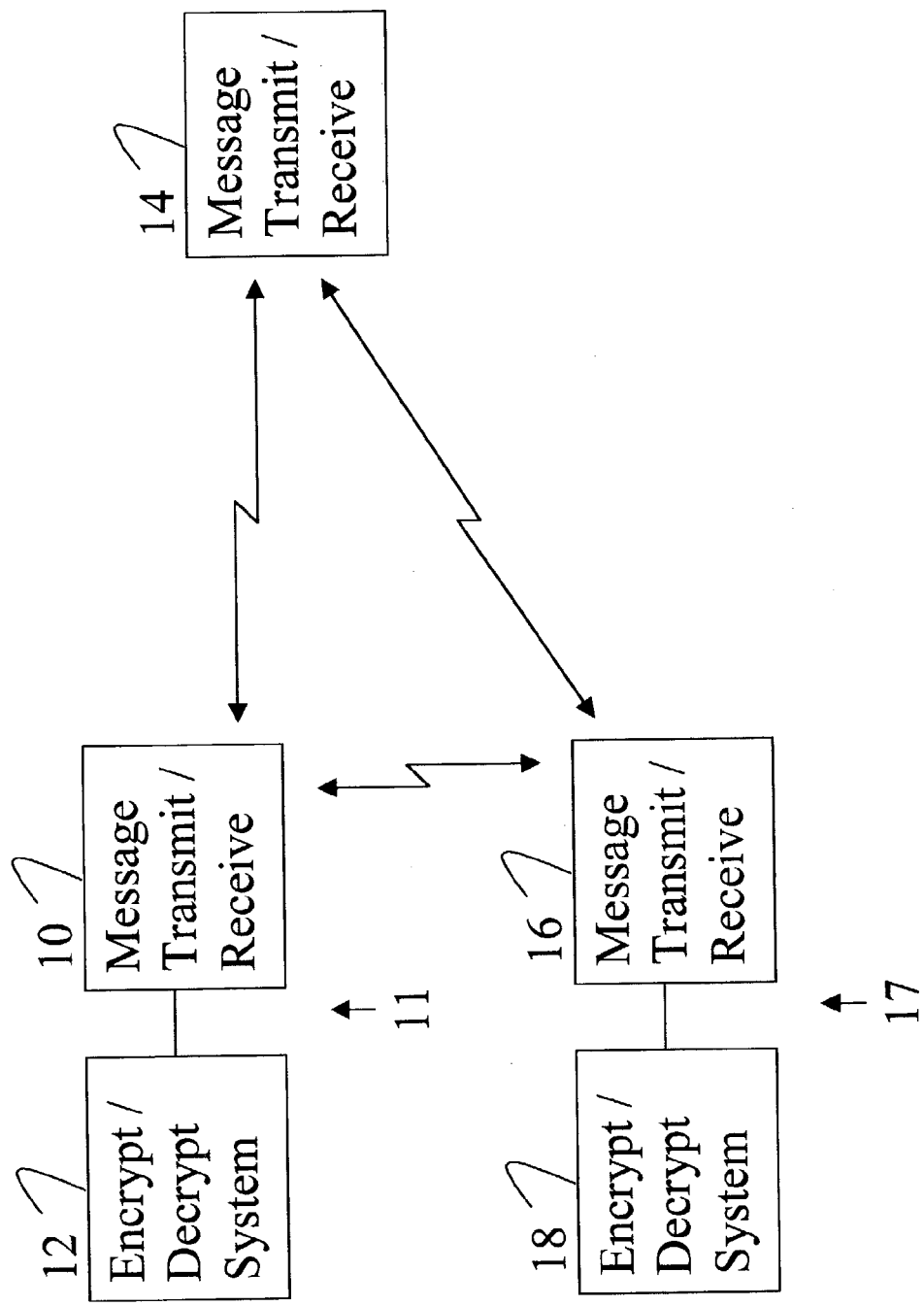
FIG. 1 is a drawing of communication sites structured to practice the invention.

The first embodiment of the invention will be described as applied to transmission of encrypted information between two authorized sites over a communications link. Referring to FIG. 1, a group of message transmit/receive devices, e.g. 10, 14,16 are capable of inter-device communication. Sites 11, 17 are provided with encrypt/decrypt systems 12, 18, but message transmit/receive device 14, while capable of communicating with message transmit/receive devices 10,16, cannot encode or decode secure messages as it does not have the necessary encrypt/decrypt system, e.g. 12,18, and therefore cannot eavesdrop on messages exchanged by the stations 11,17.

Enciphered communication between sites, e.g. 11,17, is effected by packetized transmissions formatted in accordance with a previously agreed upon protocol. For convenience of description, assume the transmission protocol uses a hypothetical format, 20, shown as FIG. 2, although the teachings of the invention are adaptable to any communication system protocol. This particular packet format, 20, has a preamble, 22, followed by a destination designator DA, 24, a sender SA designator, 26, Packet Type, 28, a Data Field, 30, and a check sum FCS, 32. The encryption package of the invention, hereafter referred to as the "payload", is totally contained within the data field, 30, of the communication protocol's packet, 20.

Each site's encrypt/decrypt system, 12, 18, consists of a hardware package and associated software. The hardware is a digital data processor with fixed or removable storage, and is provided with a special set of base transformation instructions for digital encryption/decryption, as will be described below. Additionally the digital data processor is capable of conventional data processing under software control as known in the computer art.

The contents of the encryption/decryption system are under the supervision of the cryptographic system administrator. As part of the overall system initialization, each site, e.g. 11, 17, is assigned an individual mask by the administrator; each mask being a sequence of bytes that is uniquely associated with the specific site. A mask is longer than the packet data field, 30, and typically is at least twice the size. Each site is also provided with copies of the masks for all other authorized sites that it potentially may contact, and copies of the masks are maintained in each site's storage. The system administrator, preferably in a face-to-face hand off, delivers the masks and base transformation instruction sets during system initialization to the site, or by distribution using a guaranteed secure technique. Once the initialization process is complete, the site is capable of secure communications without manual intervention.

As previously stated, the base instructions may be classified into 7 categories. Sample instructions typical of those in each of the instruction categories are set forth and discussed below:

1) Communications Setup/Connectivity Instructions
   a) Example: Re-Map Base Instructions-011 [set ID] [set of new IDs]

This important category of instructions defines the instruction framework in which the encrypted traffic will take place. It is the basic process of tailoring an instruction subset to a specific message. It includes, but is not limited to, the selection of a subset of instructions from the base set, and the camouflaging of the instruction IDs.

The above sample instruction advises the source site that the stream of bytes accompanying the instruction is a randomly selected byte sequence for changing the IDs of the base instruction set. The base instructions are arranged in a standard linear sequence, and the random bytes are aligned one-for-one against the IDs of the base instructions. The base instruction IDs are then changed to the value of the corresponding value. A set ID is provided for this new mapping. This re-mapping may stay in effect for the rest of the communication session, or by inserting the 011 instruction into a subsequent instruction sequence mandate a new re-mapping.

b) Example: Create New Instructions-012 [set ID] [parameters to create new instructions]

Concatenating the operational content of a selection of base instructions generates new instructions. The sample instructions, Swap-033, and Rotate-095, may be concatenated into a new instruction, say, Rotate and Swap-017. This instruction, valid only for the session in which it is generated, combines the algorithms of the sample instructions 033, and 095. The instructions included in this set (e.g. 017, etc.) are designated by a set ID (e.g. 2).

2) Environment/Administration Instructions
   Example: Use Start Byte-051 [value for new starting position for algorithms]

Instructions in this category tell a site how to physically set the mode of engagement with the byte stream in order to decrypt the stream. This sample instruction increases flexibility by causing the processor to begin an algorithm at a specific byte position, and the byte location is specified as a parameter in the instruction. Other related instructions might tell the decrypting processor to jump to a different location of a byte stream before performing the next instruction, or to skip a given number of bytes before performing an operation.

3) Data Computation/Substitution Instructions
   Example: Mask XOR-081

These instructions utilize the processor's capability for standard digital computation, and allow modification of all, or part of the byte stream, by the execution of mathematical and non-mathematical functions, algorithms, processes and routines.

The sample instruction directs the processor to perform an "exclusive OR" on the data utilizing the current mask, beginning at the current Start byte (e.g. 1) and ending at a specified Stop byte (e.g. 1000).

4) Data Transformation/Mutation Instructions
   Example: Rotate-033 [blocksize N] [bytes to rotate M]

This instruction requires 2 assigned parametric values to rotate every N byte block M bytes to the right in a circular fashion. The instruction 033 4 2 says to rotate every 4 byte block 2 bytes to the right in circular fashion starting with the current value for the Start byte to the current Stop byte.

Example: Swap-095 [byte N] [byte M]

Similarly, 2 parameter values are needed for this instruction in order to swap every byte N with byte M starting with the current Start byte and ending with the current Stop byte. The instruction designation to swap every $4^{th}$ byte with the current byte would be: 095 1 4. It will be appreciated that the instruction is applied to each byte in the stream starting with the current Start byte and ending with the current Stop byte.

These instructions are powerful means of scrambling a byte stream to masquerade the original arrangement of the bits of the message.

The following example is shown in detailed steps as an illustration of the instructions' effectiveness. In the example, the instructions encipher a mask sequence by applying the above sample instructions in a step-by-step process.

Assume the source site's, 11, current mask is as follows:
   007, 191, 013, 048, 251, 128, 006, 061, 077 . . . (2000 bytes total)

Thus, after the Rotate Instruction-033 the source site 11 current mask is transformed to:

013, 048, 007, 191 . . . after processing bytes 1 to 4
013, 191, 251, 048, 007 . . . after processing bytes 2 to 5
013, 191, 007, 128, 251, 048 . . . after processing bytes 3 to 6
013, 191, 007, 048, 006, 128, 251 . . . after processing bytes 4 to 7
013, 191, 007, 048, 251, 061, 006, 128 . . . after processing bytes 5 to 8
013, 191, 007, 048, 251, 128, 077, 061, 006 . . . after processing bytes 6 to 9

And, after the Swap Instruction-095:

048, 191, 007, 013 . . . after processing bytes 1 to 4
048, 251, 007, 013, 191 . . . after processing bytes 2 to 5
048, 251, 128, 013, 191, 007 . . . after processing bytes 3 to 6
048, 251, 128, 077, 191, 007, 013 . . . after processing bytes 4 to 7
048, 251, 128, 077, 061, 007, 013, 191 . . . after processing bytes 5 to 8
048, 251, 128, 077, 061, 006, 013, 191, 007 . . . after processing bytes 6 to 9

This results in the new source site station mask, i.e.

048, 251, 128, 077, 061, 006, 013, 191, 007 . . . (2000 byte total)

5) Authentication/Security

Example: Request Access-021

These instructions are in the nature of "housekeeping" routines that insure that each of the sites engaged in an information exchange are bona fide authorized participants. They are used to initiate an exchange, or could be inserted into the messages at random intervals to re-confirm the authenticity of the communicators.

6) Program Logic/Directive

Example: Repeat-091 [number of previously executed instructions N] [M times]

These instructions provide the capability to perform complex programmatic and conditional logic steps. This particular sample instruction provides the capability to repeat N previously executed set of instructions M times. Thus, to repeat the instructions 033 4 2, and 095 1 4 three times would be: 091 2 3. Other instructions in this category would include, but are not limited to: "if", "while", and "function" statements as known in the computer art.

7) Data Expansion/Contraction

Example: Random Insert-142 [N bytes of random data]

This category contains instructions used to compress data or fill empty bit positions in the digital stream so that all packets have the same size. For example, the above instruction is used to insert random bytes into the packet data field to insure that all bit positions are filled.

Example

As previously stated, the list of instructions and the message are incorporated into the payload of the transmission package. A typical payload organization is shown in Table I. The payload contents and structure are flexible, and not restricted to the configuration shown.

TABLE I

| Byte | Field Name | Length | Encrypted |
|---|---|---|---|
| 1 | Your Token | 2 | No |
| 3 | My Token | 2 | No |
| 5 | Mask Start | 2 | No |
| 7 | My Mask CRC | 4 | No |
| 11 | Jump | 2 | By Old Mask |
| 13 | My Payload ID | 1 | By Old Mask |
| 14 | Ack This Payload | 1 | By Old Mask |
| 15 | Ack For Payload ID | 1 | By Old Mask |
| 16 | Number Of Mask Instructions | 1 | By Old Mask |
| 17 | Mask Instruction List | X | By Old Mask |
| X + 1 | Number of Message Instructions | 1 | By New Mask |
| X + 2 | Message Instruction List | Y | By New Mask |
| Y + 1 | Message | Z | By New Mask |

Figure 2:
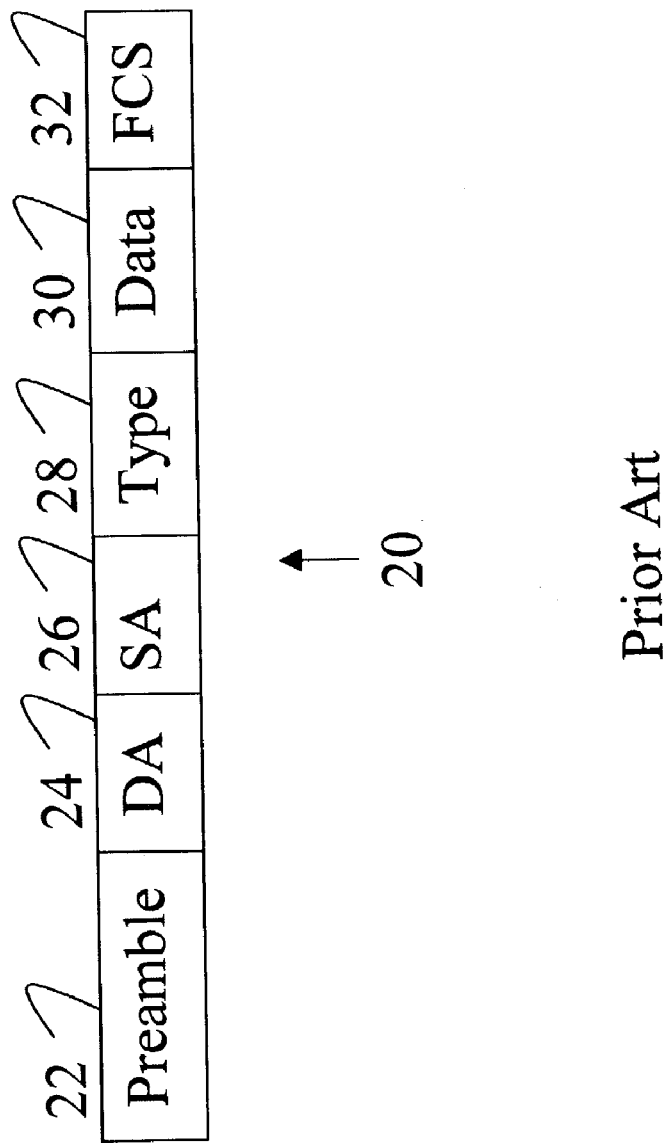
FIG. 2 is a drawing of the content of a typical digital packet known in the art.

A communication between stations, is transmitted by the source site 11 which has a message to be sent to target site 17, (FIG. 1.) Source site 11 organizes a message with a payload in the format of Table I for insertion into the packet's data field 30 (FIG. 2.). It is important that each payload be expanded to the maximum size of the data field 30 so as to force an attacker to examine $256^N$ plaintext possibilities. With a payload size of 1000 bytes, there are $256^{1000}$ (i.e. $1.7 \times 10^{2408}$) possible plaintext permutations. The expansion can be accomplished, as needed, by inserting bytes whose values are randomly determined. See previously discussed sample instruction Random Insert-142.

As a first step, the source site, 11, prepares a payload by means of its encrypt/decrypt system, 12, for establishing contact with the target site, 17. The basic payload will consist of two essential segments; a portion from which the target site can derive the new mask generated by the source for this payload, and a portion that provides information so that the target site can decipher the message in the payload.

The initial step by the source site is to send a "Request for Access" message to the target site, and this message is implemented by including it as Instruction 037 described above.

Figure 3:
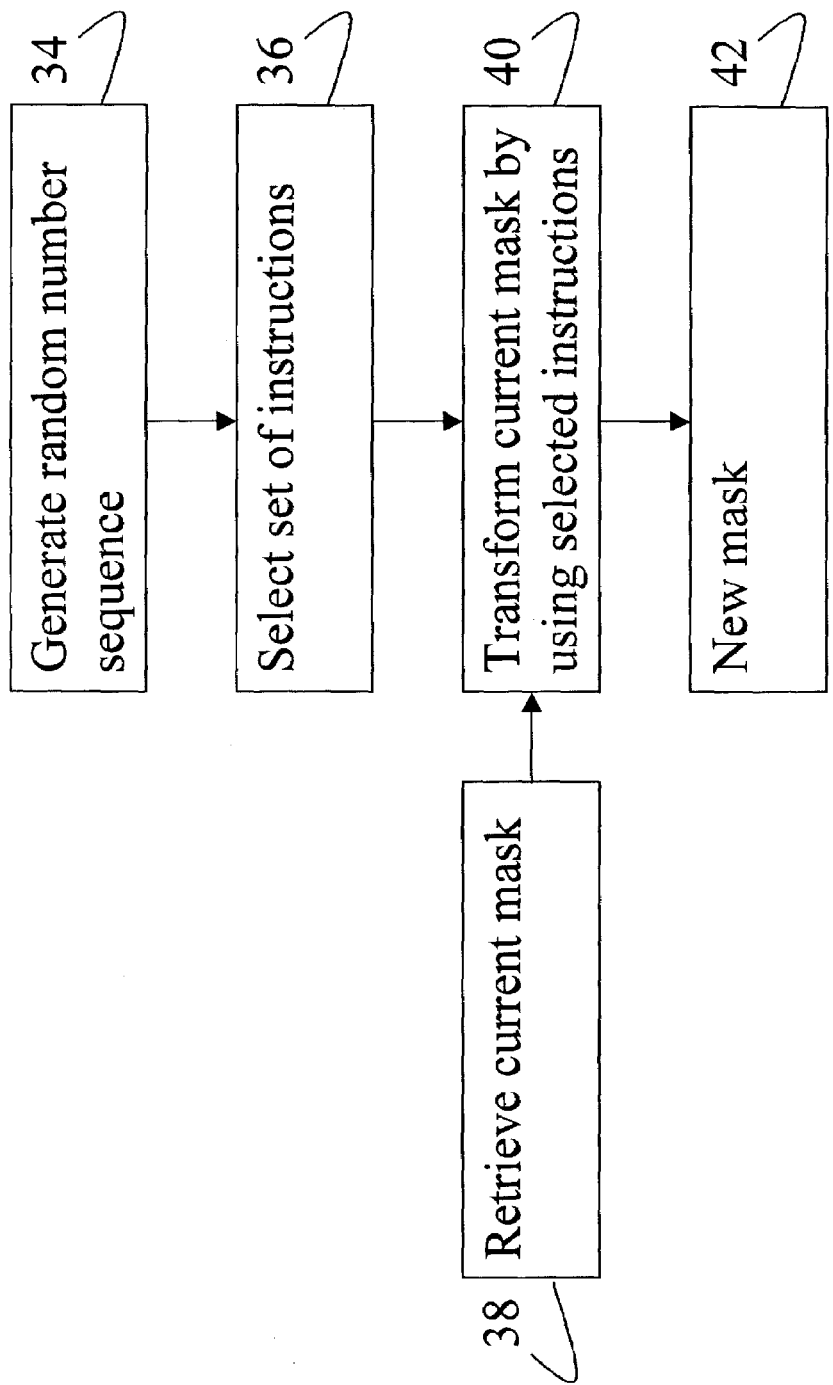
FIGS. 3–7 are flow diagrams of encryption steps in accordance with the invention.

Referring to FIG. 3, the source site generates, 34, a random number sequence and uses the sequence to select, 36, the set of transformation instructions. The randomization process may generate pseudo-random numbers by computation procedures known in the art. For the purposes of disclosure in the present example, i.e., Rotate Instruction-033 and Swap Instruction-095 have been selected. The source retrieves, 38, its current mask and the Rotate Instruction and Swap Instruction previously selected, 36, and sequentially applies 40, the instructions to the bytes of the mask to generate, 42, the new mask.

This process has been shown in detail above. The source site sequentially applies these instructions to its current mask starting with the current Start byte (e.g. 1) and continuing all the way to the current Stop byte (e.g. last byte), incrementing one byte or block of bytes at a time.

The above illustrates the method of sequentially applying a set of instructions to a byte stream, and is implemented using the site's digital data processor. It will be noted that the process starts with an assemblage of bytes, e.g., the current mask, and the instructions to transform it to a different assemblage of bytes, e.g., the new mask. This basic scrambling process is utilized repeatedly in the practice of the invention, both in encryption of the mask and the messages. Vernam like XORing is applied prior to packet transmission on top of the scrambling to further protect the payload. The above mask modification illustrates and discloses one example of a scrambling method.

Figure 4:
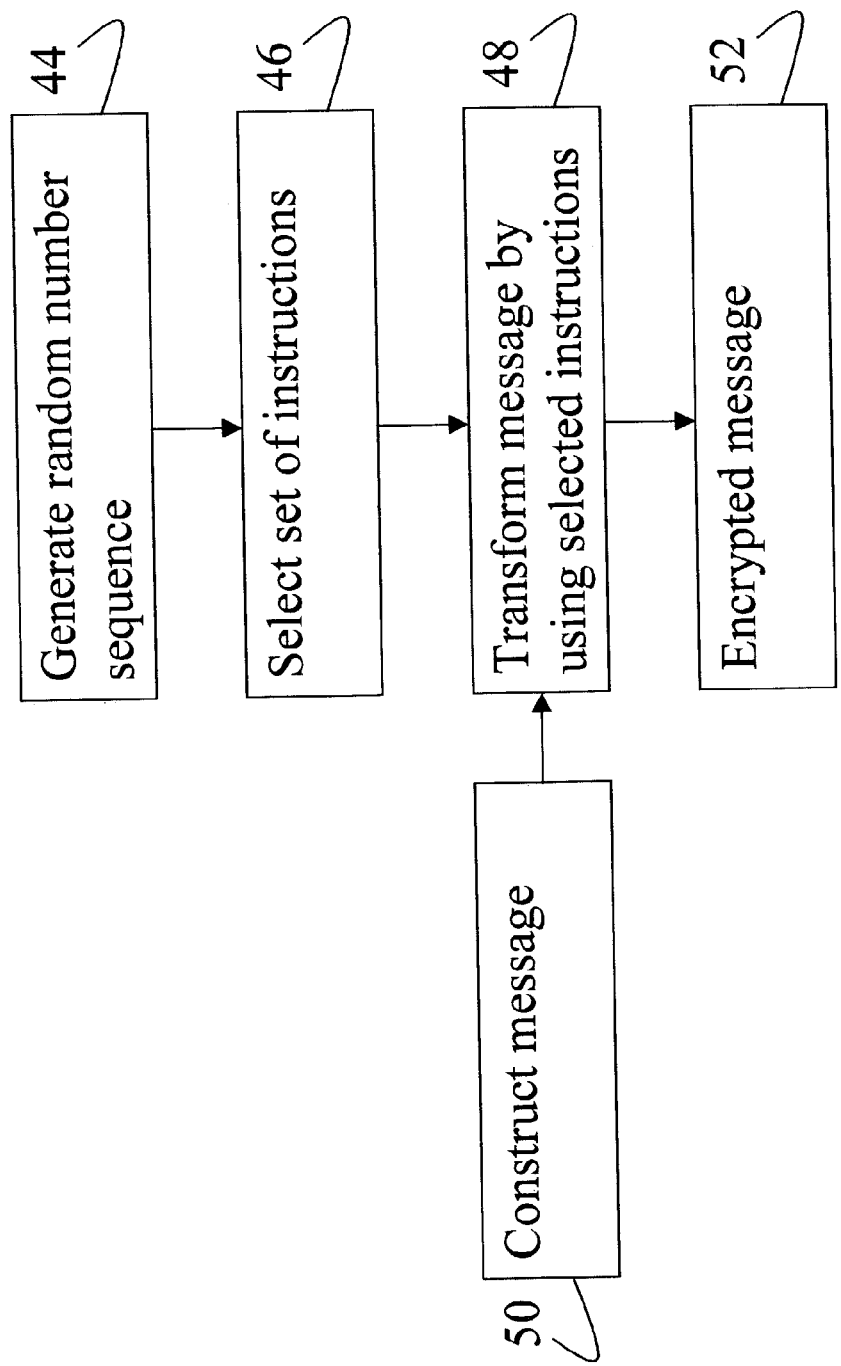

The encryption of the message follows the same steps as encryption of the mask. Referring to FIG. 4, a 2nd random number sequence is generated, 44, and used to select, 46, a 2nd set of instructions. For the purposes of keeping the present example simple, this second set is taken to be the same two instructions used in scrambling the mask above. It will be appreciated that with a larger set of instructions available, this second set would contain different instructions than those used in encrypting the mask. However, the essential core of the invention is disclosed in using this simple set. The "Request for Access", i.e. instruction 021, is retrieved, 50, and additional random bytes are attached to the "Request for Access" to completely fill the 1000 byte capacity of the payload field as previously mentioned above. Applying, 48 transforms the message, the 2nd set of instructions generates, 52, the scrambled "Request for Access" message.

Figure 5:
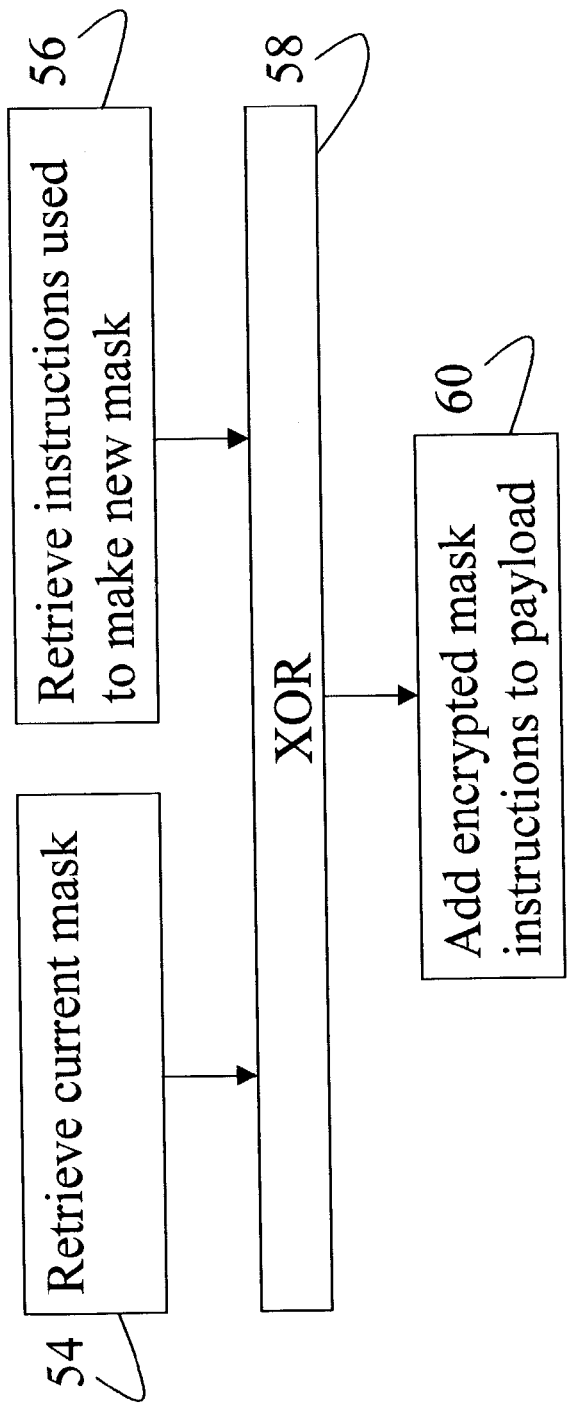
Figure 6:
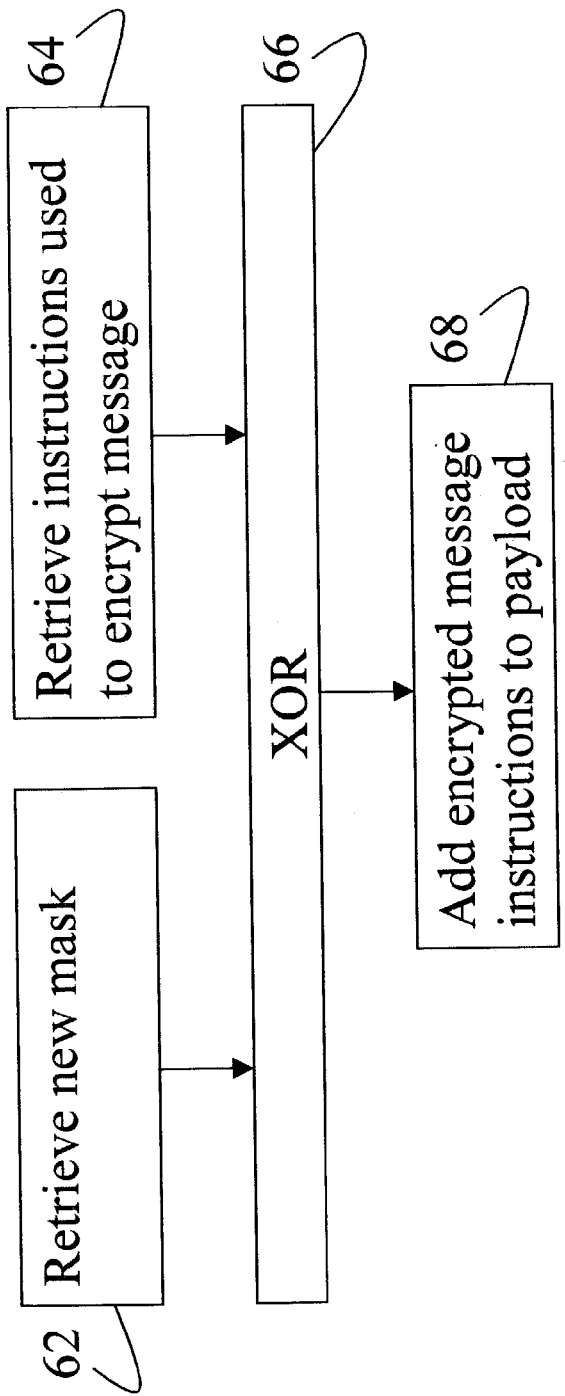

FIGS. 5 and 6 relate to the source site's further processing that will later allow the target site to recover the encrypted information. In FIG. 5, the source site retrieves, 54, its current mask, (i.e. the mask prior to conversion to the new mask), and then generates, 56, a list of the ID numbers of the instructions it used in modifying its mask. This list's items, i.e. the instruction ID's, are listed in the same order that the instructions themselves were applied during the mask modification. The current mask is XORed, 58, with this instruction list and this results in an encrypted list, 60, to be added to the payload and sent to the target site to allow it to regenerate the source site's new mask.

A substantially identical process is illustrated in FIG. 6, where the new mask is retrieved, 62, and a list of the ID's of the instructions that were used to scramble the message is also generated, 64. The bytes that comprise the instruction list and those that comprise the new mask are XORed, 66, and added to the payload, 68, to provide the encrypted message instructions for transmission.

Figure 7:
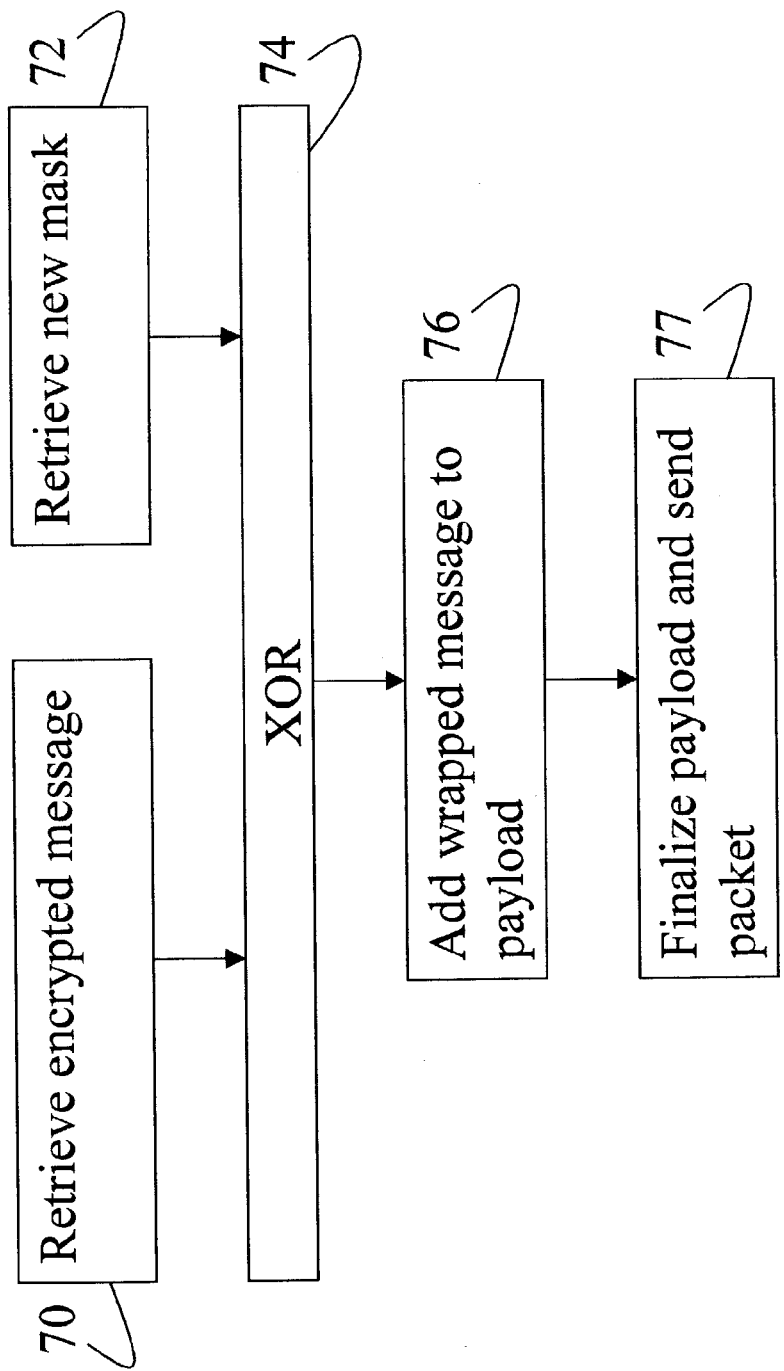

The above steps may be characterized as the first level of encryption. Referring to FIG. 7, a deeper level of encryption is next applied to the message, by retrieving, 70, the scrambled message, and retrieving, 72, the new mask. These are XORed and the resultant wrapped message is inserted into the payload of the packet for transmission to the target site.

Referring to Table I, the entries in the payload starting at Byte 16 of the chart are now available. The number of instructions (1 byte) that were used to modify the mask is entered as Byte 16, and the encrypted mask instruction list (X bytes long) is entered at Byte 17. The number of message instructions (1 byte) is entered as Byte X+1, and the encrypted message instruction list (Y bytes long) is entered at Byte X+2. The message encrypted in step, 76, is inserted at Byte Y+1 of the payload. The final packet assembly is finalized and sent to the target, 77.

Figure 8:
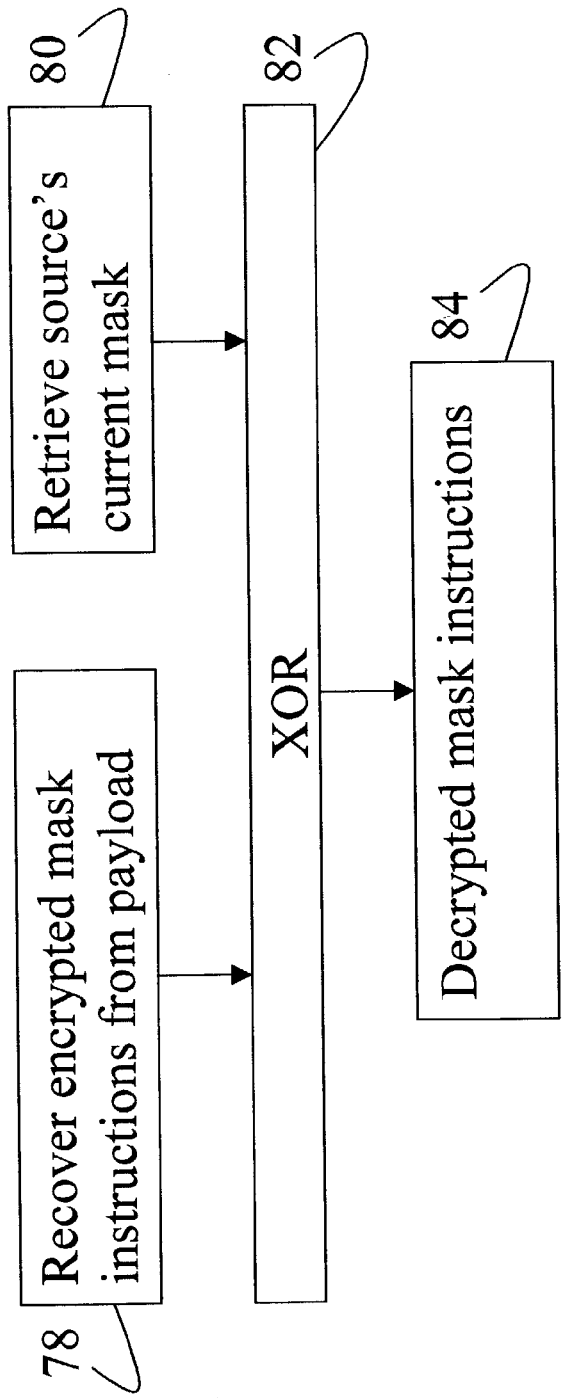
FIGS. 8–12 are flow diagrams of decryption steps in accordance with the invention.

Referring to FIG. 8, upon receipt of the packet, the target site recovers, 78, the encrypted mask instruction list from the payload, and retrieves, 80, the source site's current mask from its own storage where it has stored the current masks of relevant sites. It XORs, 82, these two parcels to recover, 84, the list of instructions used by the source site to encrypt the mask. (This XOR procedure restores the original list since it was encrypted by XORing the current mask with the list before transmission by the source site, and, as known in the art, when a masking bit stream is XORed with a message bit stream, it encrypts the message and when re-XORed with the resultant bit stream, decrypts it).

Figure 9:
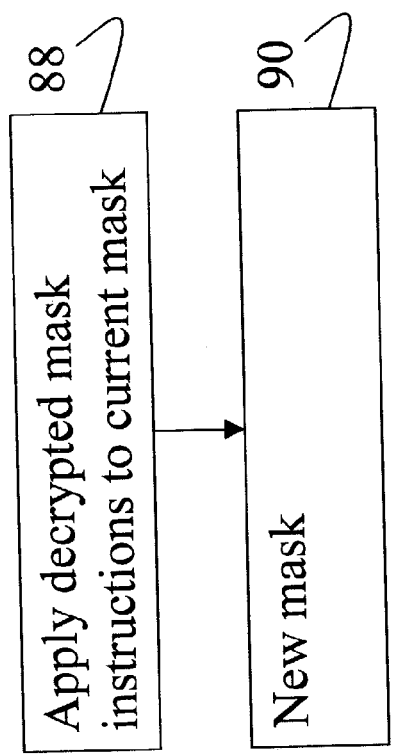

Referring to FIG. 9, the target station uses this list of transformation instructions and applies 88 them in the reverse order applied by the source to the current mask, re-generating the new mask, 90.

Figure 10:
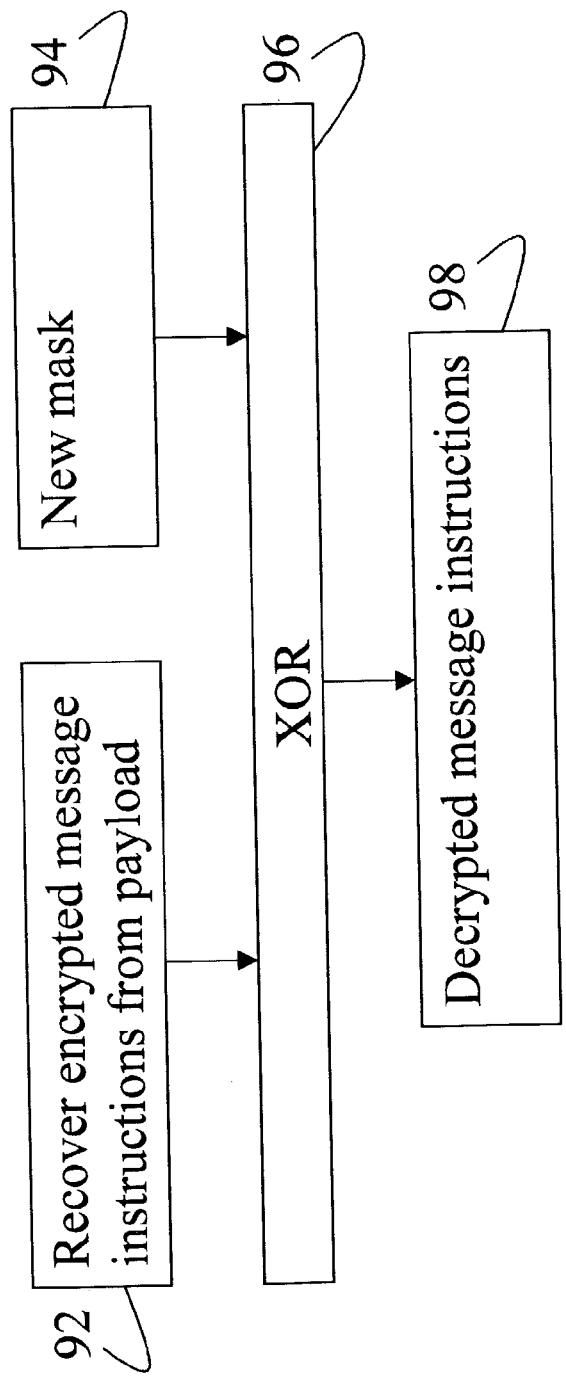
Figure 11:
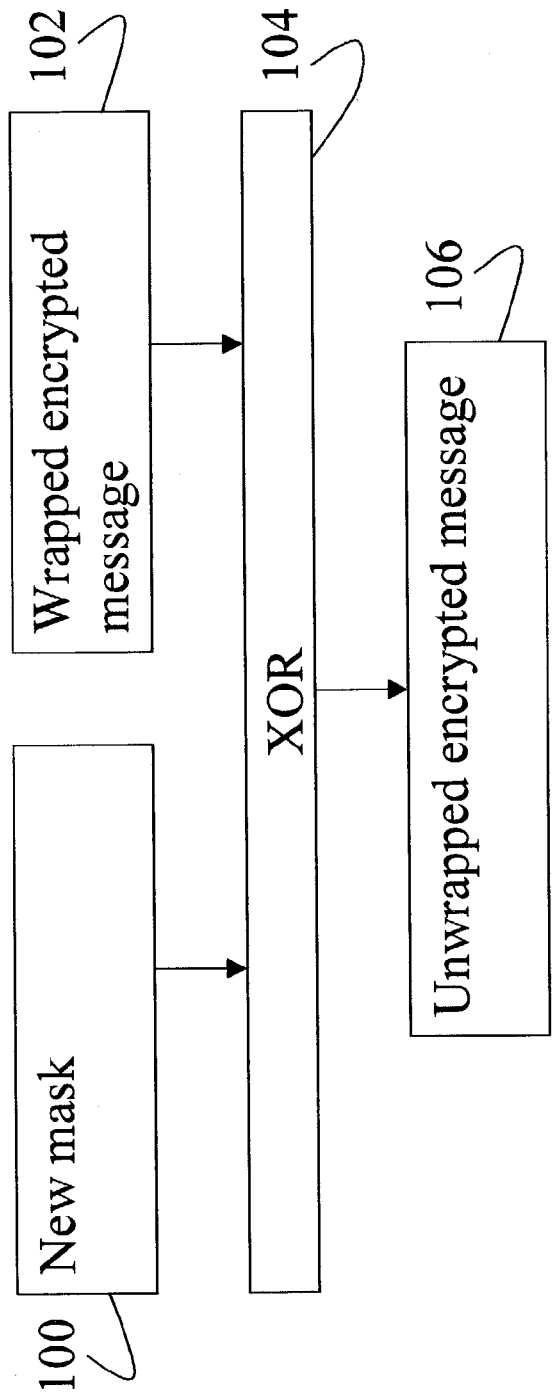
Figure 12:
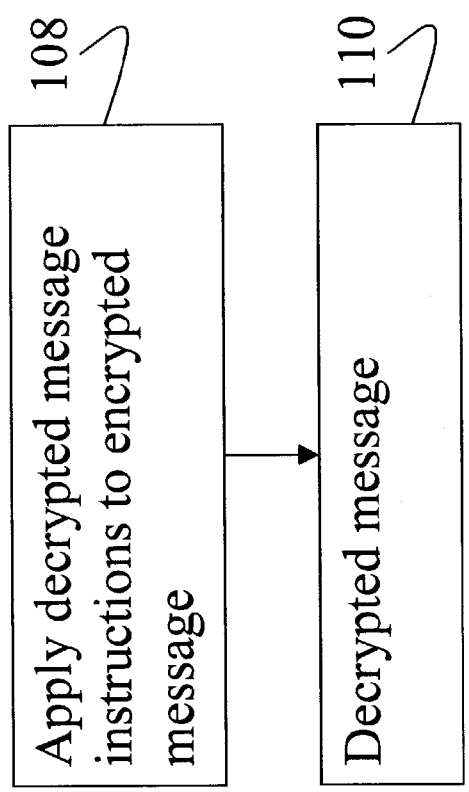

FIGS. 10, 11 and 12 essentially mirror the steps of FIGS. 7, 8 and 9 in the recovery of the message. In FIG. 10, the target site recovers, 92, the encrypted message instruction list and uses, 94, the new mask to XOR, 96, the encrypted message instruction list and new mask, generating, 98, the message instruction list in the clear. Referring to FIG. 11, the new mask, 100, and the wrapped encrypted message, 102, are XORed, 104, to generate the unwrapped encrypted message, 106. In FIG. 12, using the decrypted message instruction list, 98, the target applies, 108, the instructions in the reverse order to the unwrapped encrypted message field from the payload, and recovers, 110, the message in the clear; the message being the authenticating message, "Request for Access" (i.e. 021).

TABLE II

| ID  | Instruction    | Description                        |
| --- | -------------- | ---------------------------------- |
| ... | ...            | ...                                |
| 103 | Rotate         | Rotate block B of size N by M bytes |
| 249 | Swap           | Swap byte N with M in block B       |
| ... | ...            | ...                                |

TABLE III

| ID  | Instruction       | Description                              |
| --- | ----------------- | ---------------------------------------- |
| ... | ...               | ...                                      |
| 017 | Rotate and Swap   | Rotate block B of size N by M bytes then swap byte N with M. |
| ... | ...               | ...                                      |

The target site now prepares to authorize the source to send its message, and part of the authentication is, as previously pointed out above, to send a reply message containing the instruction sets the source must use in encrypting the message it has for the target. For the convenience of this example, the target decides to use the same instructions that were applied above to enciphering the mask, i.e. Rotate-033 and Swap-095. However, for increased obfuscation the target first applies the instruction, Re-Map Base Instructions-011, described above, including the parameters 103, 249 resulting in the remapped base instructions of Table II. The target identifies this as set 1. The target decides to provide further instruction encryption, and applies instruction, Create New Instruction-012 to the remapped instructions of Table II. The result is the concatenation of the instructions of Table II into the instruction of Table III. The target identifies this as set 2. It will be appreciated that the source in following the instructions received from the target will derive the instruction sets mandated by the target for payload transmission.

The response transmission calls for a new packet, and requires that the target site execute all the steps of FIGS. 3–7. This includes mask modification; and it is the target site's current mask that is updated to a new mask. The target site's message contains instruction sets 1 and 2, for the source site to use when sending message packets during the cryptographic session. The scrambling and XORing steps are repeated as shown, (FIGS. 3–7) and the results folded into the payload as previously described and transmitted to the source site.

It will be noted that the target site prior to assembling its message for the source site performs a second random selection of instructions. In determining the instructions for inclusion in the payload, it must go through steps, 34 and 36, of FIG. 3 to get the instructions whose list will be the content of its message to the source site.

The target site's organizes its reply by executing the steps of FIGS. 3–7 and the results are transmitted to the source site. The source site receives and decrypts this reply by following the steps of FIGS. 8–11.

As mentioned previously, it is important to ensure that the all packets have a uniform size prior to transmission and therefore need to be expanded appropriately. When the target is performing the expansion, aside from filling the packet with random byte values, it may also send additional instructions. These instructions can be related to the administration of the cryptographic session and communications link. For example, the target may request additional authentication information (i.e. challenge) from the source to return a checksum for a portion of the mask in the source's next packet, or other identifying information. The source would then provide the proper response instruction with the correct checksum in the next packet. The target could create and mandate the use of new instruction sets (e.g. 3, 4, etc.) and discontinue the use of the current instruction sets. It will be appreciated that many administrative instructions, with varying degrees of complexity, can be designed and used in the practice of this invention.

The source site may now send its original message and subsequent messages by encrypting them in accordance with the target site's provided instruction sets. The source site creates a new source mask by following the steps of FIG. 3. It encrypts its original message by following steps 48, 49, 50, of FIG. 4 using the target site provided instructions, and then completes forming its payload by following the steps of FIGS. 5–7.

These three stages of communication are required only for the first payload of the first message in the cryptographic session. Once a cryptographic session has been established, all remaining message payloads may be sent, without the need for the source to transmit a "Request for Access" message, until the cryptographic session terminates.

Referring again to Table I, Byte 1 "Your Token" is an identifier of the intended target site, and Byte 3, "My Token" is the identifier of the source site. These identifiers are assigned by the cryptographic administrator, and are included, in the clear, in the header of the transmitted payload. These tokens are used in conjunction with Byte 7, "My Mask CRC" field for authentication. The packet receiver compares these values to those values stored within his system to authenticate the message sender. If authentication fails, the receiver immediately terminates communications with the sender. It is assumed that the sender is an attacker, and should not receive any further responses from the receiver. This prevents the sender from using the response against the receiver.

Byte 5, "Mask Start" is a critical component of the encryption, and designates the starting or first byte of the mask to apply to the first byte of the message using the XOR operation. It will be appreciated that the first byte of the mask may or may not be XORed with the first byte of the message. For example, if "Mask Start" is set to 1901, then mask byte 1901 will be XORed with byte 1 of the message. Since in our example, the mask is 2000 bytes in length, when the last byte of the mask is used to XOR with byte 100 of the message, then byte 101 will be XORed with byte 1 of the mask. It will be appreciated that the mask is circular in structure and that this feature makes it possible to utilize any one of 2000 different mask sequences, possible in this example, to encrypt and decrypt a message given just a single 2000 byte mask value.

Byte 11, "Jump" is provided so that remainder of the header does not follow contiguously, but requires going to the "Jump" address to find the next header field.

Bytes 13–15, which are the fields "My Payload ID", "Ack This Payload" and "Ack For Payload ID", are used to signify that a packet has been received and understood. If the underlying native communications protocol provides the same functionality, then these fields may not be used. If a packet was received and not understood, the receiver immediately terminates communications with the sender. The sender is assumed to be an attacker. Thus, an "Ack For Payload ID" is sent only when one is requested and when the payload was properly decrypted and understood.

Other optional instructions may be included in the payload depending upon the application. These instructions may also include a "Leap" instruction (e.g. 131) to further protect the payload header from attack. The "Leap" base instruction (e.g. 131) provides the capability to skip to the specified address to retrieve the next message instruction. The "Leap" base instruction works in conjunction with the "Jump" field in the payload to obfuscate where in the payload the actual message instructions are located.

In a second embodiment of the invention, communications from source sites are not conveyed directly to target sites as described above, but are routed through a central server. The server performs the role of target, as described above, in receiving messages from sites for transfer to other sites, and performs the role of source in forwarding such messages on to the intended recipients. The operations of the server completely follow the procedural steps of FIGS. 3–11. A feature of this embodiment is that the server is a fixed station having a large amount of storage in which the continually changing masks of the multitudinous sites is maintained. This relieves the individual sites of storing the masks of its fellow sites, significantly decreasing their storage requirements. This is particularly advantageous when the user sites are mobile sites, or employ hand held processors. Each site may then only keep track of its own mask, and of the server's mask relevant to that site. The server may also perform other functions, such as acting as an interface between wireless sites vulnerable to attack, and more secure channels such as private LANs. The server can output its decrypted messages for further distribution by secure networks less susceptible to unauthorized eavesdropping.

The invention has been described in detail with particular reference to preferred embodiments thereof, but it will be understood that variations and modifications can be effected within the spirit and scope of the invention.

What is claimed is:

1. A method of updating a one-time-pad (OTP) comprising the steps of:
    a) assigning a current OTP to an encryption site,
    b) assigning a copy of said current OTP to a decryption site,
    c) providing said encryption site and said decryption site each with an identical secure compendium consisting of a set of byte modifying instructions, each of said byte modifying instructions identified by a separate, unique ID symbol,
    d) said method further comprising at said encryption site, i) generating a list of ID's of a subset of said set of byte modifying instructions from said compendium, each item of said list identified by its ID symbol,
ii) selecting the subset of byte modifying instructions from said compendium in accordance with said list of ID's of said subset,
iii) processing said current OTP in accordance with said subset of byte modifying instructions to obtain an updated, new OTP,
iv) XORing said list of ID's of said subset of byte modifying instructions with said current OTP, to provide an encrypted list,
v) transferring said encrypted list from said encryption site to said decryption site,
e) said method further comprising at said decryption site,
i) XORing said encrypted list with said copy of said current OTP, to provide a decrypted list,
ii) selecting the subset of byte modifying instructions from said compendium in accordance with said decrypted list of ID's of said subset, and
iii) processing said current copy of said OTP in accordance with said subset of byte modifying instructions to obtain said updated, new OTP, whereby said encryption site and said decryption site both have identical updated, new OTPs for use as the current OTP for use in further cryptographic communication between said encryption site and said decryption site.

2. The method of claim 1 wherein said transferring of said encrypted list is by electromagnetically transmitting said encrypted list.

3. The method of claim 1 whereby said processing is processing by a computer.

4. The method of claim 3 wherein said processing of said current OTP comprises computing on said current OTP using said byte modifying instructions by said computer.

5. The method of claim 1 whereby generating said list further comprises generating computer randomly generated numbers for use in specifying said ID's.

6. A method of updating one-time-pads (OTPs) used at a multiplicity of inter-communicating sites, said sites designated as a source site for encrypting information, and designated as a target site for decrypting information, said method comprising the steps of:
a) selecting pairs of sites from said multiplicity of sites,
b) implementing an OTP for each of said pairs of sites, each site of a given pair having the identical OTP, said identical OTP different from the OTP of any other pair of said sites,
c) storing at each site the OTPs for said site and the OTPs for all sites paired with said site,
d) providing each of said sites with an identical secure compendium consisting of a set of byte modifying instructions, each of said byte modifying instructions identified by a separate, unique ID symbol, and
e) at said source site, said method further comprising,
i) retrieving the OTP of the pair of sites consisting of said source site and of an intended target site,
ii) generating a list of ID's of a subset of said set of byte modifying instructions from said compendium, each item of said list identified by its ID symbol,
iii) selecting the subset of byte modifying instructions from said compendium in accordance with said list of ID's of said subset,
iv) XORing said list of ID's of said subset of byte modifying instructions with said OTP to provide an encrypted list of ID's,
v) processing said OTP in accordance with said subset of byte modifying instructions to obtain an new OTP,
vi) replacing said OTP with said new OTP, whereby said new OTP becomes the replacement OTP for said pair of sites,
vii) transferring said encrypted list of ID's from said source site to said target site, and
f) at said target site, said method further comprising,
i) retrieving said OTP for said pair of sites comprising said source site and said target site,
ii) XORing said encrypted list of ID's with said OTP to provide a decrypted list of ID's,
iii) selecting the subset of byte modifying instructions from said compendium in accordance with said decrypted list of ID's, and
iv) processing said OTP in accordance with said subset of byte modifying instructions to obtain said new OTP,
v) replacing said OTP with said new OTP, whereby said new OTP becomes the replacement OTP for said pair of sites, and the OTP at said source site and the OTP at said target site are identical.

7. The method of claim 6 wherein said transferring of said encrypted list is electromagnetically transmitting said encrypted list.

8. The method of claim 6 whereby said processing is processing by a computer.

9. The method of claim 8 wherein said processing comprises computing by said computer utilizing said byte modifying instructions.

10. The method of claim 6 whereby generating said current list further comprises obtaining computer generated random numbers for use in specifying said ID's.

11. A method of cryptographically communicating a message between pairs of a multiplicity of inter-communicating sites, said sites designated a source site for encrypting said message for transmission, and designated a target site for decrypting on receiving said message, said method comprising the steps of:
a) selecting pairs of sites from said multiplicity of sites,
b) implementing an OTP at each of said pairs of sites, each site of a given pair having the identical OTP, said identical OTP different from the OTP of any other pair of said sites,
c) storing at each site the OTPs for said site and the OTPs for the other sites paired with said site,
d) providing each of said sites with an identical secure compendium consisting of a set of byte modifying instructions, each of said byte modifying instructions identified by a separate, unique ID symbol, and
e) at said source site, in encrypting said message by said source site of a pair for decrypting by said target site of said pair, said method further comprising,
i) retrieving the OTP of the pair of sites consisting of said source site and of said target site,
ii) generating a first list of ID's of a first subset of said set of byte modifying instructions from said compendium, each item of said first list identified by its ID symbol,
iii) selecting the first subset of byte modifying instructions from said compendium in accordance with said first list of ID's of said first subset,
iv) XORing said first list of ID's of said first subset of byte modifying instructions with said OTP to provide an encrypted first list of ID's, v) processing said OTP in accordance with said first subset of byte modifying instructions to obtain a new OTP, vi) generating a second list of ID's of a second subset of said set of byte modifying instructions from said compendium, each item of said second list identified by its ID symbol, vii) selecting the second subset of byte modifying instructions from said compendium in accordance with said second list of ID's of said second subset, viii) processing said message in accordance with said second subset of byte modifying instructions to obtain an encrypted message, ix) XORing said second list of ID's of said second subset of byte modifying instructions with said new OTP to provide encrypted message instructions, x) wrapping said encrypted message by XORing said encrypted message with said new OTP to provide a wrapped encrypted message, xi) concatenating said encrypted first list of ID's, said encrypted second list of ID's and said wrapped encrypted message to comprise a transmission payload to said target site, f) at said target site, said method further comprising, i) retrieving said OTP for said pair of sites comprising said source site and said target site, ii) XORing said encrypted first list of ID's from said payload with said OTP to provide a decrypted first list of ID's, iii) selecting the first subset of byte modifying instructions from said compendium in accordance with said decrypted first list of ID's, and iv) processing said OTP in accordance with said first subset of byte modifying instructions to obtain said new OTP, v) XORing said new OTP with said encrypted second list of ID's from said payload to obtain said decrypted second list of ID's vi) XORing said new OTP with said wrapped encrypted message to obtain an unwrapped encrypted message, vii) processing said unwrapped encrypted message in accordance with said second subset of instructions to obtain said message in the clear, viii) replacing said OTP with said new OTP, whereby the OTPs at said source site and at said target site are identical, and further whereby said new OTPs becomes the replacement OTPs for said pair of sites.

12. The method of claim 11 wherein said transferring of said payload is electromagnetically transmitting said payload.

13. The method of claim 11 whereby said processing is processing by a computer.

14. The method of claim 13 whereby said processing comprises computing by said computer utilizing said byte modifying instructions.

15. The method of claim 11 whereby generating said first and said second lists further comprises obtaining computer generated random numbers for use in specifying said ID's.

16. The method of claim 11 whereby said concatenating comprises formatting into packets.

17. The method of claim 16 whereby said new OTP is generated on a packet by packet basis.

18. The method of claim 16 whereby said formatting further comprises including said payload and a header in said packet.

19. The method of claim 18 comprising establishing the size of said OTP to be longer than said payload.

20. The method of claim 18 whereby said formatting comprises formatting said header for transmission in unencrypted clear.

21. The method of claim 20 whereby said formatting of said header further comprises including administrative data in said header.

22. The method of claim 11 whereby selecting said sites comprises selecting a server as one member of each pair of sites.

23. The method of claim 22 whereby distributing said messages among said sites is performed through said server.

24. The method of claim 22 whereby distributing information to locations not included as said sites is performed through said server.

25. The method of claim 11 whereby said communicating is by electromagnetic means.

26. The method of claim 11 specifying parameters in said byte modifying instructions whereby said parameters set forth operational changes performed by said instructions.

27. The method of claim 26 whereby said selecting said parameters includes defining the mode and duration of the application of said operational changes effected by said parameters.

28. A system for cryptographically communicating a message between pairs of a multiplicity of inter-communicating sites, said sites designated a source site when encrypting said message for transmission, and designated a target source when decrypting on receiving said, said system comprising:

a) means for selecting pairs of sites from said multiplicity of sites, b) an OTP at each of said pairs of sites, each site of a given pair having the identical OTP, said identical OTP different from the OTP of any other pair of said sites, c) a storage unit at each site wherein the OTPs for said site and the OTPs for the other sites paired with said site are stored, d) at each site, an identical secure compendium consisting of a set of byte modifying instructions, each of said byte modifying instructions identified by a separate, unique ID symbol, and e) at said source site, means for encrypting said message by said source site of a pair for decrypting by said target site of the pair, said system further comprising, i) means for retrieving the OTP of the pair of sites consisting of said source site and of said target site, ii) means for generating a first list of ID's of a first subset of said set of byte modifying instructions from said compendium, each item of said first list identified by its ID symbol, iii) means for selecting the first subset of byte modifying instructions from said compendium in accordance with said first list of ID's of said first subset, iv) means for XORing said first list of ID's of said first subset of byte modifying instructions with said OTP to provide an encrypted first list of ID's, v) means for processing said OTP in accordance with said first subset of byte modifying instructions to obtain an new OTP, vi) means for generating a second list of ID's of a second subset of said set of byte modifying instructions from said compendium, each item of said second list identified by its ID symbol, vii) means for selecting the second subset of byte modifying instructions from said compendium in accordance with said second list of ID's of said second subset,

- viii) means for processing said message in accordance with said second subset of byte modifying instructions to obtain an encrypted message,
- ix) means for XORing said second list of ID's of said second subset of byte modifying instructions with said new OTP to provide encrypted message instructions,
- x) means for wrapping said encrypted message by XORing said encrypted message with said new OTP to provide a wrapped encrypted message,
- xi) means for concatenating said encrypted first list of ID's, said encrypted second list of ID's and said wrapped encrypted message to comprise a transmission payload to said target site, f) at said target site, said system further comprising,
- i) means for retrieving said OTP for said pair of sites comprising said source site and said target site,
- ii) means for XORing said encrypted first list of ID's from said payload with said OTP to provide a decrypted first list of ID's,
- iii) means for selecting the first subset of byte modifying instructions from said compendium in accordance with said decrypted first list of ID's, and
- iv) means for processing said OTP in accordance with said first subset of byte modifying instructions to obtain said new OTP,
- v) means for XORing said new OTP with said encrypted second list of ID's from said payload obtain said decrypted second list of ID's
- vi) means for XORing said new OTP with said wrapped encrypted message to obtain an unwrapped encrypted message,
- vii) means for processing said unwrapped encrypted message in accordance with said second subset of instructions to obtain said message in the clear,
- viii) means for replacing said OTP with said new OTP, whereby the OTPs at said source cite and at said target site are identical, and further whereby said new OTPs becomes the replacement OTPs for said pair of sites.

29. The system of claim 28 further comprising means for transferring of said payload by electromagnetic transmission of said payload.

30. The system of claim 28 further comprising means for processing by a computer.

31. The system of claim 30 wherein said means for processing comprises computing by said computer utilizing said byte modifying instructions.

32. The system of claim 28 further comprising means for generating said first and said second lists by obtaining computer generated random numbers for use in specifying said ID's.

33. The system of claim 28 wherein said means for concatenating comprises means for formatting into packets.

34. The system of claim 33 wherein said means for formatting further comprises including said payload and a header in said packet.

35. The system of claim 34 wherein said means for formatting comprises means for transmitting said header in unencrypted clear.

36. The system of claim 34 wherein said means for formatting of said header further comprises administrative data in said header.

37. The system of claim 28 comprising means for generating said new OTP on a packet by packet basis.

38. The system of claim 37 wherein the size of said OTP is longer than said payload.

39. The system of claim 28 where said means for selecting said sites comprises a server as one member of each pair of sites.

40. The system of claim 39 wherein distribution of said messages among said sites is performed through said server.

41. The system of claim 39 where distribution information to locations not included in said sites is performed through said server.

42. The system of claim 28 wherein said means for said communicating is electromagnetic means.

* * * * *